BEST AVAILABLE COPY

W. A. IVES.

Machines for Forming Auger-Bitts.

No. 5,455. Reissued June 17, 1873.

Witnesses

J. H. Shumway

A. J. Tibbits

William A. Ives
Inventor
By Atty.
Thos. P. Earle

AM. PHOTO-LITHOGRAPHIC CO. N.Y. (OSBORNE'S PROCESS.)

UNITED STATES PATENT OFFICE.

WILLIAM A. IVES, OF NEW HAVEN, CONNECTICUT.

IMPROVEMENT IN MACHINES FOR FORMING AUGER-BITS.

Specification forming part of Letters Patent No. 124,683, dated March 19, 1872; reissue No. 5,455, dated June 17, 1873; application filed January 23, 1873.

*To all whom it may concern:*

Be it known that I, WILLIAM A. IVES, of New Haven, in the county of New Haven and State of Connecticut, have invented a new Improvement in Machines for Forming Auger-Bits; and I do hereby declare the following, when taken in connection with the accompanying drawings and the letters of reference marked thereon, to be a full, clear, and exact description of the same, and which said drawings constitute part of this specification, and represent, in—

Figure 1:
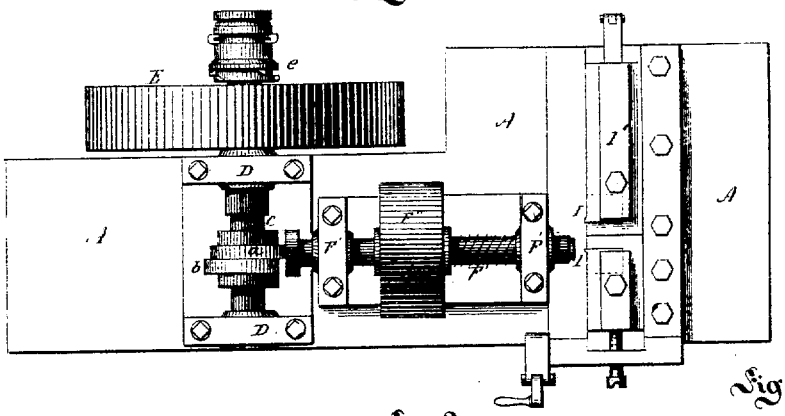
Figure 2:
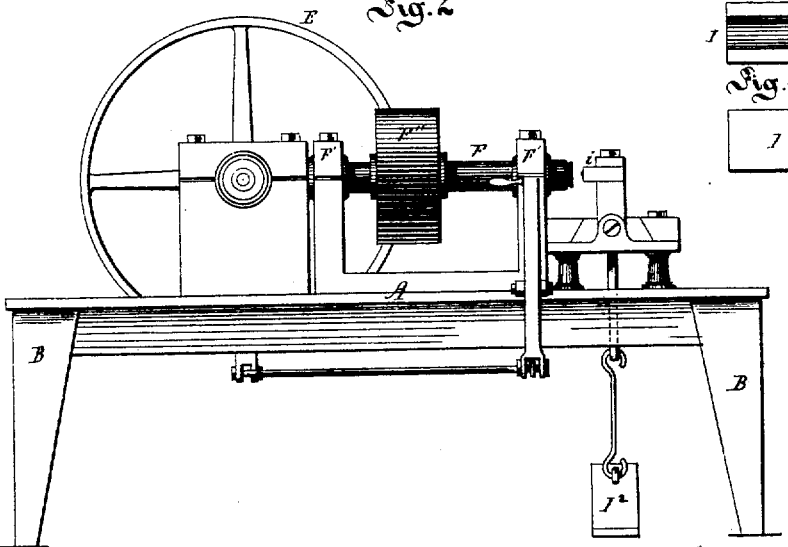
Figure 3:
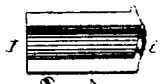
Figure 4:
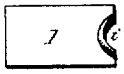

Figure 1, a top view; Fig. 2, a side view; Figs. 3, 4, 5, 6, and 7, views of detached parts; and in Figs. 8 and 9, side views of augers, for the better illustration of my invention.

In the manufacture of augers and similar boring-instruments, the lips have heretofore been turned and formed by hand, forging with hammers made for the purpose, and requiring the best skilled labor, and is the most expensive part of the process in the manufacture of augers. By the term auger I wish to be understood as embracing, generally, boring instruments.

By my invention this labor to a great extent is dispensed with, the process simplified, and the expense, consequently, greatly reduced; and the invention consists in the arrangement of a revolving mandrel, combined with suitable holding-dies, which mechanically spin or draw the lips of the auger into the required shape.

Figure 5:
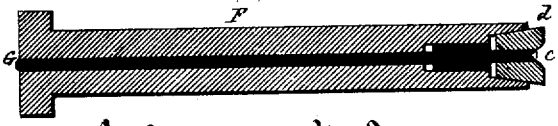
Figure 6:
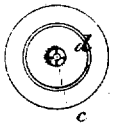

A is the bed of the machine, supported upon legs B; C, a shaft, supported and so as to revolve freely in bearings D, and, by preference, is driven by the application of power to a loose pulley, E, connected with the shaft by a clutch, *e*. F is a mandrel, supported and so as to revolve freely in bearings F′, by the application of power thereto through a pulley, F″. The axis of the said mandrel F is at right angles, and nearly or exactly in line with the axis of the shaft C, as seen in Figs. 1 and 2. The said mandrel, represented in section, enlarged, in Fig. 5, is made hollow, so that a spindle, G, passes through its center so as to strike a cam, *a*, on the shaft C, the spindle arranged to move longitudinally through the mandrel. The mandrel also has a longitudinal movement in its bearings, forced back by means of a spring, as seen in Figs. 1 and 2, the head of the mandrel being formed so that a cam, *b*, upon the shaft C will, at the proper time, strike and force the mandrel forward. In the outer end of the spindle G a die, *c*, is formed, of the diameter of the auger to be operated upon, and in form corresponding to the shape of the lip and point of the auger when finished. Over the die *c*, and in the end of the mandrel, is fixed a sizing-die, *d*, the die *c* working freely through the die *d*, so that the die *d* passes on over, and so as to size the end of the auger. I are the holding-dies, represented in Fig. 1 as open, the dies shown detached and enlarged in Figs. 3 and 4, Fig. 3 being a central view, and Fig. 4 an end view. The end of the die I is formed so as to lie in the twist of the auger at the extreme end, and of the shape which it is required to form the lips, as seen at *i* in Figs. 3 and 4. These holding-dies are arranged, one or both, upon independent slides, here represented as one stationary, the other upon a slide, $I^1$, and to this slide a treadle, $I^2$, is attached, so that, by pressing down on the said treadle, the slide $I^1$ will be driven forward and pressed against the other part of the die, closing the die upon the auger placed therein.

If preferred, the other die may be connected to the same treadle, and moved to and from the central line in like manner, it only being essential that the treadle operate to close the dies upon the blank in the proper axial position.

Operating or closing the dies by means of the foot is essential, because the work must be quickly done. The auger must be worked upon while at a high heat, and it naturally cools quickly; hence the workman has one hand upon the apparatus for connecting the power, the other hand for introducing the blank. He must necessarily close the dies upon the blank with his foot, in order that the forming-dies may commence their work instantly upon the closing of the holding-dies upon the auger.

The dies are clamped together when the auger-blank is placed between, so as to grasp and hold the auger firmly, and in position centrally before the mandrel F, and when fixed in this position, and the shaft and mandrel revolving, the cam *a* on the shaft C first forces forward the spindle G (which is revolving rapidly with the mandrel) against the blank, (which has been previously heated,) and by the revolving motion of the die *c* the end of the auger is spun or turned down onto the lips *i* of the holding-die I, forming the point and lip or lips of the auger. To turn up the lip and size the end of the auger, the cam *b* strikes and forces forward the revolving mandrel F, so that the die *d* passes on over the end of the auger, turning the lip up and bringing the end of the auger to the required size; then the auger is removed from the machine, a second placed therein, and operated on as before.

For different-sized augers, it will be understood that different dies are introduced into the same machine.

Figure 7:
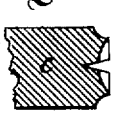
Figure 8:
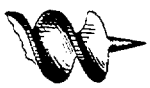
Figure 9:
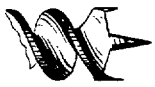

As thus far described, the machine is adapted especially for the augers seen in Fig. 8, without spurs, the curve of the lip avoiding the use of the spur; but if for spur-augers, as seen in Fig. 9, the die *c* should be formed as seen in Fig. 7, so as to spin the lip, leaving a recess at the edge of the die *c* for the formation of the spur; then, after the end is formed, as before, substituting the requisite die, as in Fig. 7; then the sizing or finishing die passes on in like manner, as before.

It will therefore be readily seen by those skilled in the art, that a change of dies for different kinds of augers may be made, so that any form required may be given to the cutting end of the boring instrument.

I claim as my invention—

1. In the process of forming the cutting end of boring instruments, the arrangement of two dies, the one within the other, the central or inner die operating to form the point and floor lip or lips, the outer passing over the other or inner die to turn up and size the lip or lips, substantially as specified.

2. In combination with dies or other suitable means for holding the auger, a revolving die or device, which forms the floor lip or lips and point, and turns up or sizes the head, substantially as described.

3. In combination with the dies I, for holding the auger and the forming-dies, the treadle $I^2$, attached to the slide or slides carrying the dies I, and so as to operate the said dies, substantially as set forth.

4. In combination with the dies *c* and *d*, the holding-dies I, substantially as and for the purpose specified.

5. In combination with the mandrel F, and spindle G, and dies *c* and *d*, the cams *a* and *b*, so as to operate the said dies, as and for the purpose specified.

WM. A. IVES.

Witnesses:
J. H. SHUMWAY,
A. J. TIBBITS.